(12) United States Patent
Inadome et al.

(10) Patent No.: US 8,314,977 B2
(45) Date of Patent: Nov. 20, 2012

(54) IMAGE READING DEVICE AND IMAGE FORMING APPARATUS

(75) Inventors: Takanori Inadome, Kanagawa (JP); Noriaki Orikasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1163 days.

(21) Appl. No.: 12/045,338

(22) Filed: Mar. 10, 2008

(65) Prior Publication Data
US 2008/0231916 A1    Sep. 25, 2008

(30) Foreign Application Priority Data

Mar. 23, 2007 (JP) ................. 2007-076482
Dec. 28, 2007 (JP) ................. 2007-340516

(51) Int. Cl.
*H04N 1/04* (2006.01)
*H04N 1/46* (2006.01)
*G05F 1/00* (2006.01)

(52) U.S. Cl. ........ 358/475; 358/474; 358/497; 358/505; 358/509; 315/291; 315/307; 315/247

(58) Field of Classification Search .................. 358/475, 358/509, 497, 474, 505; 315/291, 307, 247
See application file for complete search history.

(56) References Cited

U.S. PATENT DOCUMENTS

| | | | | |
|---|---|---|---|---|
| 3,819,981 A | * | 6/1974 | Diamond | 315/86 |
| 4,686,428 A | * | 8/1987 | Kuhnel et al. | 315/307 |
| 5,982,110 A | * | 11/1999 | Gradzki | 315/247 |
| 6,198,234 B1 | * | 3/2001 | Henry | 315/291 |
| 2002/0186427 A1 | | 12/2002 | Orikasa | |

FOREIGN PATENT DOCUMENTS

| | | |
|---|---|---|
| JP | 61-80967 | 4/1986 |
| JP | 2-276362 | 11/1990 |
| JP | 9-15754 | 1/1997 |
| JP | 2002-374383 | 12/2002 |
| JP | 2005-45309 | 2/2005 |
| JP | 2005-182141 | 7/2005 |
| JP | 2006-270920 | 10/2006 |

OTHER PUBLICATIONS

Japanese Office Action issued Dec. 6, 2011 in patent application No. 2007-340516.

* cited by examiner

*Primary Examiner* — Cheukfan Lee
(74) *Attorney, Agent, or Firm* — Oblon, Spivak, McClelland, Maier & Neustadt, L.L.P.

(57) ABSTRACT

A turning-on control unit causes a turning-on unit to apply to a light source an initial voltage when turning on the light source and to apply a rated voltage after the light source has been turned on. The initial voltage is higher than the rated voltage. An image-signal control unit controls analog signals to be input to an analog signal processing unit from a turn-on time point that is a time point at which the light source is turned on until a stabilization time point that is a time point at which output of the light source is stabilized.

4 Claims, 9 Drawing Sheets

IMAGE READING DEVICE AND IMAGE FORMING APPARATUS

CROSS-REFERENCE TO RELATED APPLICATIONS

The present application claims priority to and incorporates by reference the entire contents of Japanese priority documents, 2007-076482 filed in Japan on Mar. 23, 2007 and 2007-340516 filed in Japan on Dec. 28, 2007.

BACKGROUND OF THE INVENTION

1. Field of the Invention

The present invention relates to an image reading device and an image forming apparatus.

2. Description of the Related Art

In an image reading device such as a scanner, a photoelectric conversion unit reads an image on an original as an analog image signal and a signal processing unit performs analog signal processing including amplification to convert the analog signal into a digital signal. Thereafter, various types of image processing are performed on the digital signal.

FIG. 9 is a schematic diagram of a typical image reading device. The image reading device includes an exposure glass 2 on which an original 11 is placed. The exposure glass 2 is arranged on an upper surface of a scanner chassis 1. The image reading device further includes an optical scanning system that is arranged below the exposure glass 2 and inside the scanner chassis 1. The optical scanning system includes a first carriage 4 that includes a light source (lamp) 3 and a first reflecting mirror 4a, a second carriage 5 that includes a second reflecting mirror 5a and a third reflecting mirror 5b, and a lens unit 6.

The image reading device further includes an image sensor 8 that is mounted on a sensor board 7, and a signal processing unit 10 that processes an image signal received via a signal cable 9. A shading plate 12 for correcting various types of errors is arranged in front of the exposure glass 2.

When reading the original 11, a stepping motor (not shown) drives the first carriage 4 and the second carriage 5 to move them in a direction indicated by an arrow A shown in FIG. 1, i.e., in a sub scanning direction. The stepping motor moves the second carriage 5 at a speed half of that of the first carriage 4. While the first and second carriages 4 and 5 are moving, a lower surface (image surface) of the original 11 is exposed to light from the light source 3.

The light reflected from the lower surface of the original 11 is sequentially reflected and deflected by the first reflecting mirror 4a, the second reflecting mirror 5a, and the third reflecting mirror 5b and is guided to the lens unit 6. The lens unit 6 converges the light on the surface of the image sensor 8. As a result, a reduced image of an image read from the original 11 is formed in the image sensor 8. The image sensor 8 converts the light (image) into an electric signal corresponding to density of the image (intensity of the light) and outputs the electric signal as an analog image signal (voltage signal). The analog image signal is output from the sensor board 7 and input to the signal processing unit 10 via the signal cable 9.

A xenon lamp or a halogen lamp has been generally used as a light source of such an image reading device. However, halogen lamps and xenon lamps are expensive and big. Therefore, now days, cold cathode fluorescent lamps (CCFL) are preferred over halogen lamps and xenon lamps from a viewpoint of cost, size, and service life.

However, a warm-up period of CCFLs is longer than that of xenon lamps. The warm-up period is a time period from a time point at which a CCFL is turned on to a time point at which the output of the CCFL is stabilized, i.e., the light amount emitted from the CCFL is stabilized to a predetermined amount. The warm-up period is also called stabilization time or wait time. To shorten the warm-up period, one approach is to apply an initial voltage that is higher than a rated voltage to the CCFL when turning on the CCFL.

For example, Japanese Patent Application Laid-open No. 2005-45309 discloses a technology for shortening the stabilization time. When a CCFL is turned on, an initial voltage higher than a rated voltage is applied to the CCFL. At every predetermined time after the CCFL is turned on, an image sensor for reading an image detects an amount of light emitted by the CCFL. When the variation in the amount of light during a predetermined period is lower than a predetermined value, an analog image signal output from the image sensor is adjusted to a gain value and a white balance is adjusted for an analog-to-digital (A/D) conversion. Thereafter, application of the rated voltage to the CCFL is started, so that the CCFL is ready for reading the image.

However, if the initial voltage higher than the rated voltage, the amount of light emitted from the CCFL increases immediately after the CCFL is turned on. Thus, the image sensor outputs an analog image signal (voltage signal) having a voltage higher than that of an analog image signal output when the output of the CCFL is stabilized, i.e., it stably emits a predetermined amount of light. Therefore, the analog image signal exceeds a tolerance of the input voltage of an analog signal processing unit (analog front end (AFE)) that performs processing, such as amplification, on the analog image signal and converting the analog image signal into a digital signal to be output to a signal processing unit. This may damage the image reading device.

SUMMARY OF THE INVENTION

It is an object of the present invention to at least partially solve the problems in the conventional technology.

According to an aspect of the present invention, there is provided an image reading device including a light source including a cold cathode fluorescent lamp that emits a light to an original to expose the original; a turning-on unit that turns on the light source by applying any one of a rated voltage of the light source and an initial voltage that is higher than the rated voltage; an image sensor that receives light reflected from the original and converts received light into an analog signal; an analog signal processing unit that converts the analog signal received from the image sensor into digital data; a turning-on control unit that causes the turning-on unit to apply to the light source the initial voltage when turning on the light source and to apply the rated voltage after the light source has been turned on; and an image-signal control unit that controls analog signals to be input to the analog signal processing unit from a turn-on time point that is a time point at which the light source is turned on until a stabilization time point that is a time point at which output of the light source is stabilized.

According to another aspect of the present invention, there is provided an image forming apparatus including an image reading unit that outputs digital data; and an image forming unit that prints the digital data on a recording medium. The image reading unit includes a light source including a cold cathode fluorescent lamp that emits a light to an original to expose the original; a turning-on unit that turns on the light source by applying any one of a rated voltage of the light source and an initial voltage that is higher than the rated voltage; an image sensor that receives light reflected from the original and converts received light into an analog signal; an analog signal processing unit that converts the analog signal received from the image sensor into digital data; a turning-on control unit that causes the turning-on unit to apply to the light source the initial voltage when turning on the light source and to apply the rated voltage after the light source has been turned on; and an image-signal control unit that controls analog signals to be input to the analog signal processing unit from a turn-on time point that is a time point at which the light source is turned on until a stabilization time point that is a time point at which output of the light source is stabilized.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a flowchart of an image-signal control process performed by a control unit shown in FIG. 1 when the image reading device is turned on;

FIG. 7 is a flowchart of an image-signal control process performed by a control unit shown in FIG. 6 when the image reading device is turned on;

DETAILED DESCRIPTION OF THE PREFERRED EMBODIMENTS

Exemplary embodiments of the present invention are explained in detail below with reference to the accompanying drawings.

Figure 1:
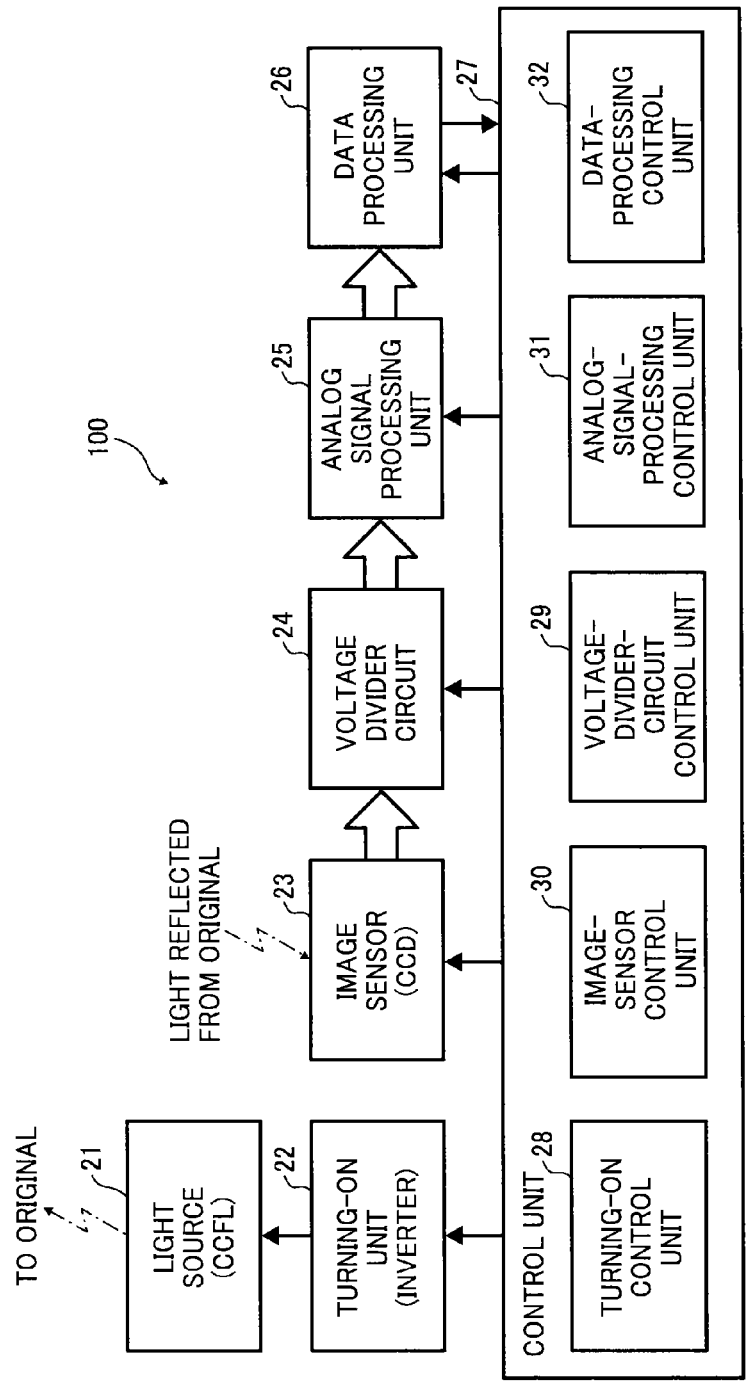
FIG. 1 is a block diagram of an image reading device according a first embodiment of the present invention.
Figure 9:
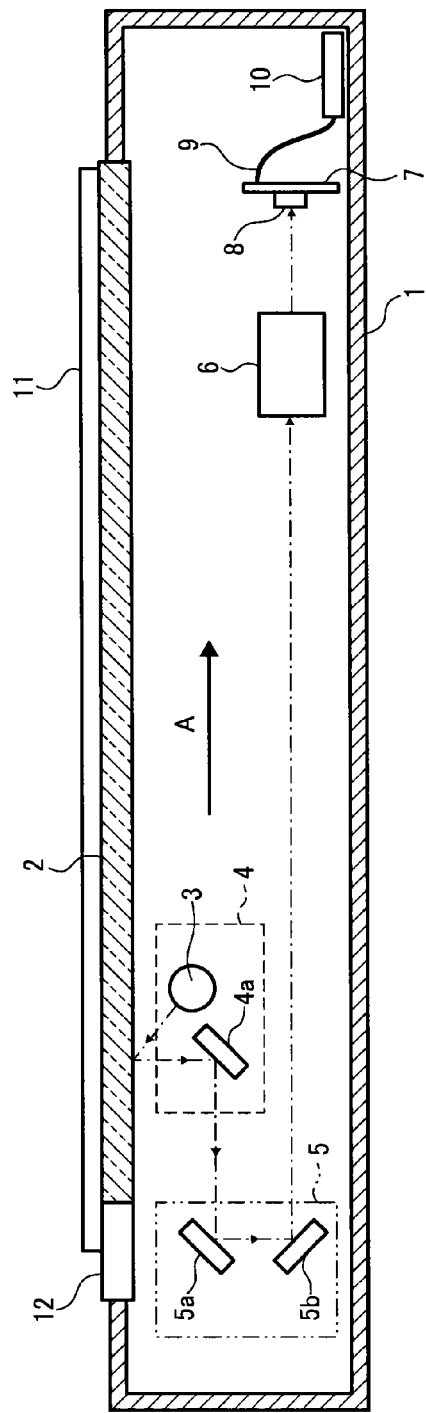
FIG. 9 is a schematic diagram of an example of a conventional image reading device.

An image reading device (scanner) 100 according to a first embodiment of the present invention is explained below with reference to FIGS. 1 to 5. FIG. 1 is a block diagram of the image reading device 100. The image reading device 100 includes a light source 21, a turning-on unit 22, an image sensor 23, a voltage divider circuit 24, an analog signal processing unit 25, a data processing unit 26, and a control unit 27. An optical scanning system, which functions as the first and second carriages 4 and 5 shown in FIG. 9, a stepping motor for moving the optical scanning system in a sub scanning direction, and a drive circuit for driving the stepping motor, are omitted from FIG. 1.

A CCFL is employed as the light source 21. The CCFL has a certain warm-up period. The turning-on unit 22 includes an inverter that applies a voltage to the light source 21 to turn on the light source 21 (i.e., cause the light source 21 to start emitting light) under the control of the control unit 27. An initial voltage higher than a rated voltage is applied to the light source 21 when turning on the light source 21. When the light source 21 has turned on, the rated voltage is applied to the light source 21 to shorten a period from when the light source 21 is turned on until the output of the light source 21 is stabilized, i.e., it stably emits the predetermined amount of light.

The image sensor 23 receives light reflected from an original, and converts the light into an electric signal. In a reduction optical system such as the one shown in FIG. 9, a charge coupled device (CCD) image sensor is generally employed as the image sensor 23. The CCD image sensor can be the one for color image or the one for black and white image. A black and white CCD image sensor sequentially outputs analog image signals each having a voltage corresponding to a density (brightness) of each pixel of an image in a predetermined line cycle in a main scanning direction. A color CCD image sensor sequentially outputs analog image signals each having a voltage corresponding to a density of a color component (generally, red, greed, and blue) of each pixel of an image in a predetermined line cycle.

The voltage divider circuit 24 reduces a voltage of the analog image signal output from the image sensor 23 by voltage division, and then, inputs the voltage to the analog signal processing unit 25. The control unit 27 issues a command for enabling or disabling a voltage division function of the voltage divider circuit 24.

The analog signal processing unit 25 includes an amplifier circuit (not shown) and an A/D converter circuit (not shown). The amplifier circuit amplifies the analog image signal to a level suitable for A/D conversion, and the A/D converter circuit converts the analog image signal into digital image data. If an analog image signal is input by AC coupling via a capacitor, a clamp circuit for setting a black offset level and a sample-hold circuit for constantly outputting analog image signals are also provided.

The digital image data output from the analog signal processing unit 25 is input to the data processing unit 26. The data processing unit 26 performs data processing (image processing) including black reference level calculation, shading correction, and γ correction. If three-color image data is processed, correction among lines is performed. In this case, the data processing unit 26 is not necessarily employed and can be omitted.

The control unit 27 includes a microcomputer (not shown). The microprocessor includes a central processing unit (CPU), a read only memory (ROM), and a random access memory (RAM), and controls the turning-on unit 22, the image sensor 23, the voltage divider circuit 24, the analog signal processing unit 25, and the data processing unit 26. The control unit 27 further includes a turning-on control unit 28, a voltage-divider-circuit control unit 29, an image-sensor control unit 30, an analog-signal-processing control unit 31, and a data-processing control unit 32.

The turning-on control unit 28 controls the turning-on unit 22. When turning on the light source 21, the turning-on control unit 28 causes the turning-on unit 22 to apply a voltage higher than a rated voltage to the light source 21 and, when the light source 21 has been turned on, apply the rated voltage to the light source 21.

The voltage-divider-circuit control unit 29 controls the voltage divider circuit 24. Specifically, the voltage-divider-circuit control unit 29 enables the voltage division function of the voltage divider circuit 24 until determining that output of the light source 21 is stabilized, and thereafter, disables the voltage division function. In this manner, the analog image control signal output from the image sensor 23 is controlled.

The image-sensor control unit 30 controls the image sensor 23, the analog-signal-processing control unit 31 controls the analog signal processing unit 25, and the data-processing control unit 32 controls the data processing unit 26.

Figure 2:
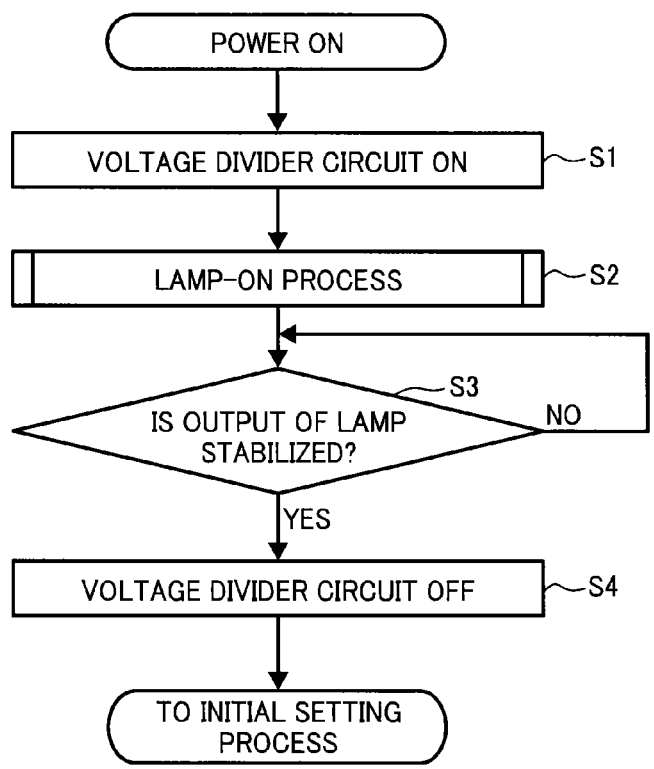

FIG. 2 is a flowchart of an image-signal control process performed by the microcomputer of the control unit 27 when the image reading device 100 is turned on. The image-signal control process corresponds to a function of the voltage-divider-circuit control unit 29.

The image-signal control process is started when the image reading device 100 enters a power-on state from a power-off state. The image reading device 100 enters a power-on state when the image reading device 100 is turned on, or when the image reading device 100 returns to an operating state from power-saving mode upon receiving a reading command with the light source being off. The power-saving mode is a state where a minimum power is supplied to the control unit 27, while the operating state is a state where a necessary power is supplied to each unit of the image reading device 100 to cause the light source 21 to emit light (turn on the CCFL).

In the image-signal control process, first, the control unit 27 turns on (enables) the voltage divider circuit 24 (step S1). The control unit 27 causes the turning-on unit 22 to cause the light source 21 to start emit light (hereinafter, "lamp-on process") (step S2).

The control unit 27 determines whether the output of the light source 21 is stabilized, i.e., it is stably emitting the predetermined amount of light (step S3).

The control unit 27 turns off (disables) the voltage divider circuit 24 (step S4) when the output of the light source 21 is stabilized. Thereafter, an initial setting process including black level calculation and shading correction is performed for reading an image, and reading of an original starts.

Figure 3:
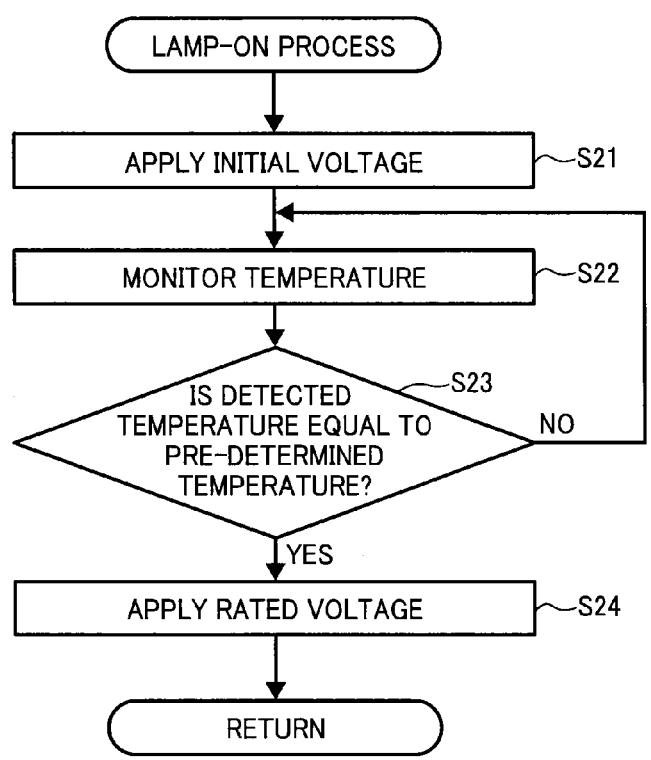
FIG. 3 is a detailed flowchart of a lamp-on process shown in FIG. 2.

FIG. 3 is a detailed flowchart of the lamp-on process shown in FIG. 2. The lamp-on process corresponds to a function of the turning-on control unit 28. The control unit 27 causes the turning-on unit 22 to apply an initial voltage (for example, 24 volts) that is higher than a rated voltage to the light source 21 (step S21).

A temperature sensor (not shown), such as a thermistor, detects the current temperature of the light source 21, and sends a signal indicative of the current temperature to the control unit 27. The control unit 27 monitors the temperature of the light source 21 (step S22) based on the signal received from the temperature sensor, and determines whether the current temperature of the light source 21 is equal to a pre-determined temperature (step S23). The control unit 27 repeats steps S22 and S23 until the temperature of the light source 21 reaches the pre-determined temperature.

When the temperature of the light source 21 has reached the pre-determined temperature, the control unit 27 causes the turning-on unit 22 to apply the rated voltage (for example, 18 volts) to the light source 21 (step S24), and the process control goes back to the routine shown in FIG. 2.

In the above explanation, the turning-on unit 22 is controlled (the function of the turning-on control unit 28) by controlling the voltage divider circuit 24 (the function of the voltage-divider-circuit control unit 29) when the light source 21 is cased to start emitting light. However, a different routine can be employed after the initial voltage is applied to the light source 21. The process explained with reference to FIG. 2 for turning on the voltage divider circuit 24 can be performed immediately after the initial voltage is applied to the light source 21. Furthermore, the time when voltage applied to the light source 21 is switched from the initial voltage to the rated voltage is not limited to when the temperature of the light source 21 reaches the pre-determined temperature but can also be switched when the amount of light emitted by the light source 21 (hereinafter, "light emission amount") reaches a predetermined value, or after a predetermined time from the application of the initial voltage.

Figure 4:
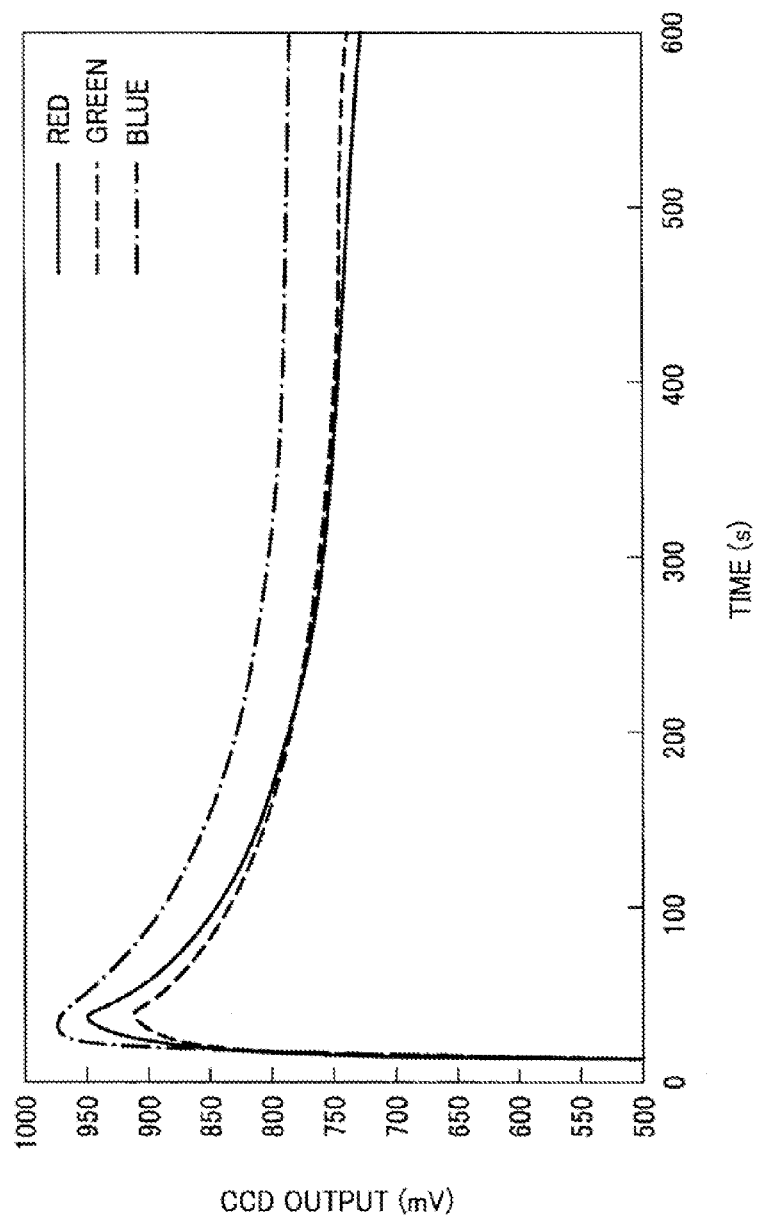
FIG. 4 is a graph of variation in an output of an image sensor.

FIG. 4 is a graph of variation in output of the image sensor 23 after the light source 21 starts emitting light ("lamp on"). In the first embodiment, a white image is read, employing, as the image sensor 23, a 3-line CCD color image sensor that electrically converts the image of the original into three color components of red, green, and blue. As shown in FIG. 4, a solid line shown in FIG. 4 represents variation of a CCD output of red, a dotted line represents a CCD output of green, and an alternate long and short dash line represents a CCD output of blue.

As shown in FIG. 4, after about 10 seconds from application of the initial voltage higher than the rated voltage to the light source 21 at a time 0 shown in FIG. 4, the light source 21 starts light emission and the light emission amount rapidly increases, and accordingly, the CCD output also rapidly increases. At a time point at which the temperature of the light source 21 reaches the pre-determined temperature, which is about 30 seconds from the application of the initial voltage, the voltage applied to the light source 21 is switched to the rated voltage. After that time point, the light emission amount gradually decreases and the rate of decreasing the light emission amount gradually decreases, which varies the CCD output.

Thus, by applying an initial voltage higher than a rated voltage of a light source, the output of the light source can be stabilized at an appropriate level in a shorter time. However, because the light emission amount rapidly increases when the light source 21 starts emitting light, the voltage of the analog image signal (CCD output) output from the image sensor 23 rapidly increases. If such a high CCD output is input to the analog signal processing unit 25, an input voltage tolerance Vafe may be exceeded, which may damage an integrated circuit (IC) of the analog signal processing unit 25.

To take care of this issue, in the first embodiment, the voltage division function of the voltage divider circuit 24 is enabled (on) to control the analog image signal output from the image sensor 23 by voltage division, and then, the controlled analog image signal is input to the analog signal processing unit 25.

Figure 5:
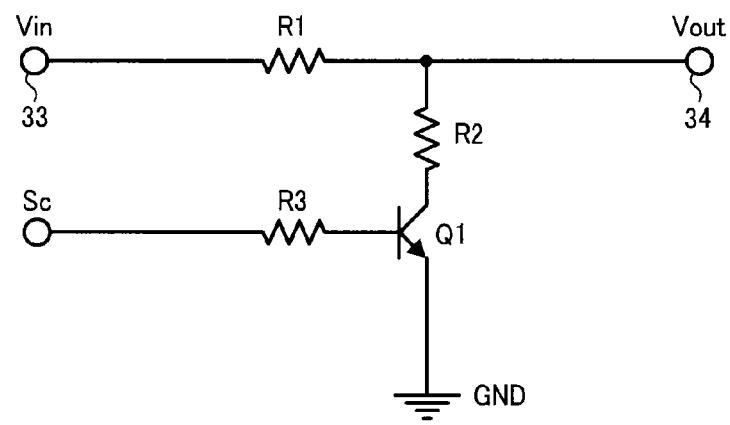
FIG. 5 is an exemplary circuit diagram of a voltage divider circuit shown in FIG. 1.

FIG. 5 is an exemplary circuit diagram of the voltage divider circuit 24. The voltage divider circuit 24 includes a first resistor R1, and a series circuit including a second resister R2 and a switching element Q1. The first resistor R1 is arranged in series on a signal path between the image sensor 23 and the analog signal processing unit 25. The second resistor R2 is connected between an output of the first resistor R1 and a ground GND. The switching element Q1 is a switching transistor having a base to which a control signal Sc is applied via a base resistor R3. However, some other circuit element can be employed as the switching element Q1.

When the control signal Sc at a high (H) logical level is applied to the switching element Q1, the switching element Q1 is switched on, so that the voltage division function is on. Specifically, voltage division is performed by the first resistor R1 and the second resistor R2 as represented by Equation (1):

$$Vout = \frac{R2}{R1+R2} \times Vin \qquad (1)$$

where R1 is a resistance of the first resistor R1, R2 is a resistance of the second resistor R2, Vin is a voltage of an analog image signal output from the image sensor 23 and input to an input terminal 33, and Vout is a voltage obtained by voltage division output to an output terminal 34 and input to the analog signal processing unit 25. There is no principal to determine the resistances R1 and R2, and it suffices that the ratio of R2 to R1+R2 satisfies Inequality (2):

$$Vafe \geq \frac{R2}{R1+R2} \times Vccdm \qquad (2)$$

where Vccdm is a maximum output voltage of the image sensor 23 and Vafe is an input voltage tolerance of the analog signal processing unit 25.

Thus, the timing of switching on the switching element Q1 to enable the voltage divider circuit 24 is not necessarily before the initial voltage is applied to the light source 21 ("lamp on"). In other words, the switching element Q1 can be switched on after the "lamp on" at any timing as long as the output voltage Vccd of the image sensor 23 satisfies Vccd<Vafe.

Alternatively, by monitoring the output voltage Vccd of the image sensor 23 and based on a result of the monitoring, the voltage divider circuit 24 can be enabled. In this case, for example, the voltage divider circuit 24 is enabled when the output voltage Vccd is 70% of the input voltage tolerance Vafe.

If the voltage divider circuit 24 is turned off before the output of the light source 21 is stabilized, the CCD output exceeds the input voltage tolerance Vafe of the analog signal processing unit 25, which may damage the IC of the analog signal processing unit 25.

The control unit 27 determines that the output of the light source 21 is stabilized at step S3, for example, (1) when an amount of variation in the light emission amount detected at every predetermined time is below a set value, (2) when the light emission amount is at a predetermined appropriate value, (3) after a predetermined time from the application of the initial voltage to the light source 21, (4) when an amount of variation in the white-level voltage of the analog image signal output from the image sensor 23, which is detected at every predetermined time, is below a set value, or (5) when an amount of variation in the white-level voltage of the analog image signal output from the image sensor 23, which is detected at every predetermined time, is below the output voltage tolerance of the analog signal processing unit 25.

The conditions (4) and (5) are based on the relation that the light emission amount is in proportion to the output voltage of the image sensor 23. The white-level voltage is a voltage of the analog signal output from the image sensor 23 after the image reading device 100 reads the shading plate 12 instead of an original. Because the image sensor 23 does not output a voltage higher than the white-level voltage, the IC of the analog signal processing unit 25 is not damaged as long as the white-level voltage is lower than the input voltage tolerance Vafe of the analog signal processing unit 25.

If any one of the conditions (1) to (5) is satisfied, the control unit 27 determines that the output of the light source 21 is stabilized and sets the control signal Sc at a low (L) logical level to turn off the switching element Q1 to disable the voltage divider circuit 24, so that an analog image signal output from the image sensor 23 is directly input to the analog signal processing unit 25. An analog switch or a digital switch can be employed as the voltage divider circuit 24.

In the first embodiment, until it is determined that the output of the light source 21 is stabilized, an analog image signal output from the image sensor 23 and to be input to the analog signal processing unit 25 is controlled by causing the voltage divider circuit 24 to convert the analog image signal by voltage division. This prevents input of an excessive voltage to the analog-signal-processing control unit 31, which prevents damage to the analog signal processing unit 25.

An image reading device (scanner) 200 according to a second embodiment of the present invention is explained below with reference to FIGS. 6 and 7, focusing on aspects different from those of the first embodiment. The image reading device 200 does not include a voltage dividing circuit, moreover, a control unit of the image reading device 200 has a function different from that of the image reading device 100. The image reading device 200 includes units that have basically the same or similar configuration as that of the first embodiment and referred by the same reference characters as those of the first embodiment, and the same explanation is not repeated below.

Figure 6:
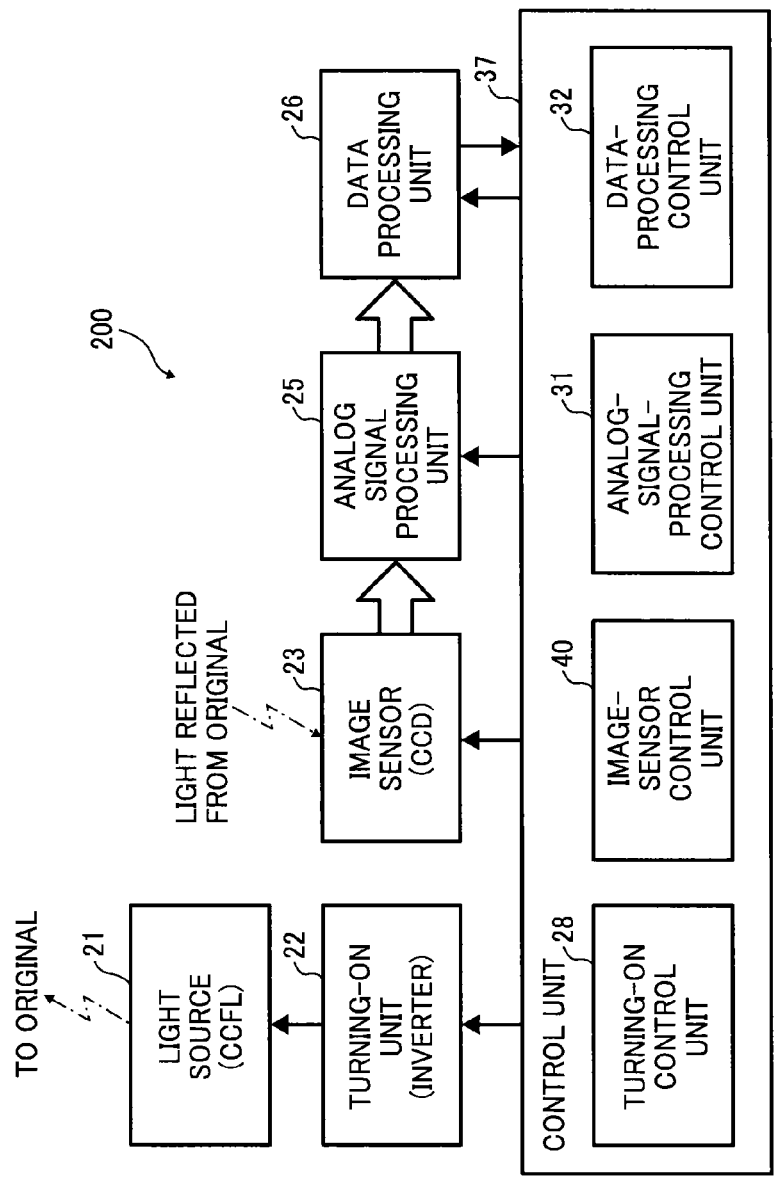
FIG. 6 is a block diagram of an image reading device according to a second embodiment of the present invention.

FIG. 6 is a block diagram of the image reading device 200. The image reading device of the second embodiment includes the light source 21, the turning-on unit 22, the image sensor 23, the analog signal processing unit 25, data processing unit 26, and a control unit 37.

The control unit 37 includes a microcomputer (not shown). The microcomputer includes a CPU, a ROM, and a RAM, and controls the turning-on unit 22, the image sensor 23, the analog signal processing unit 25, and the data processing unit 26. The control unit 37 further includes the turning-on control unit 28, an image-sensor control unit 40, the analog-signal-processing control unit 31, and the data-processing control unit 32.

The image-sensor control unit 40 performs CCD clock control to control the image sensor 23. In the CCD clock control, until the output of the light source 21 is stabilized, the control unit 37 synchronizes a timing of a PH clock input to the image sensor 23 and a timing of an RS signal input to the image sensor 23. The PH clock is a transfer clock for sequentially outputting stored charge, and the RS signal is a reset pulse for resetting an output level of each pixel. Once the output of the light source 21 is stabilized, the timings of the PH clock and the RS signal are changed to normal ones for reading an image.

The image-sensor control unit 40 can also perform CCD shift pulse control in addition to the CCD clock control. In the CCD shift pulse control, until the output of the light source 21 is stabilized, a cycle of a shift pulse (SH pulse) (hereinafter, "shift pulse cycle") corresponding to a charge storage time of each pixel of one line of the image sensor 23 is set to one shorter than a normal one for reading an image. Once the output of the light source 21 is stabilized, the shift pulse cycle is changed to a normal one for reading an image.

In this manner, the image-sensor control unit 40 controls the analog image signal output from the image sensor 23 by the CCD clock control and the CCD shift pulse control. It suffices that the image-sensor control unit 40 has any one of a CCD clock control function and a CCD shift pulse control function.

Figure 7:
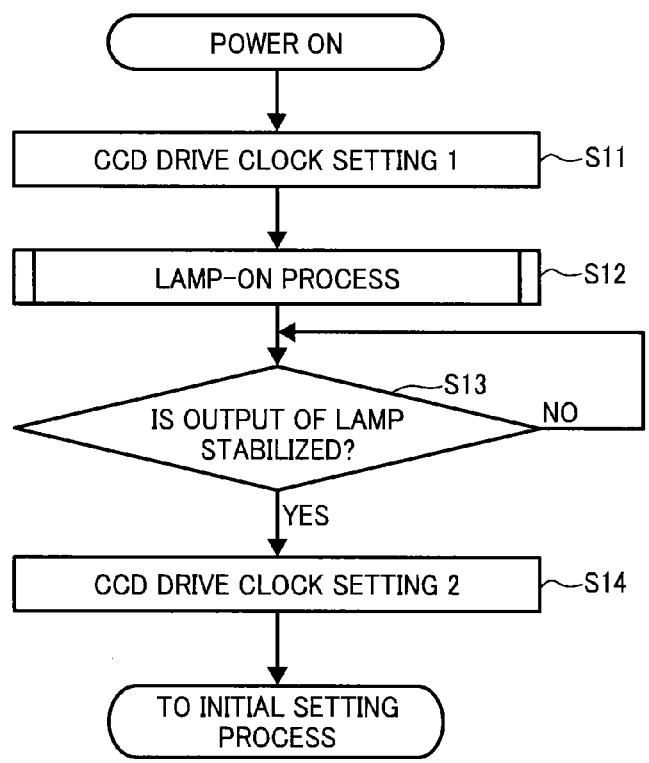

FIG. 7 is a flowchart of an image signal control process performed by the microcomputer of the control unit 37 when the image reading device 200 is turned on. The image signal control process corresponds to a function of the image-sensor control unit 40.

As in the case of the first embodiment, the image signal control process is started when the image reading device enters a power-on state In the image signal control process, first, the control unit 27 performs a CCD drive clock setting 1 of the CCD clock control (step S11). In the CCD drive clock setting 1, the image sensor 23 is prevented from outputting a signal by synchronizing the timings of the PH clock and the RS signal.

Thereafter, the lamp-on process is performed (step S12). The lamp-on process explained with reference to FIG. 3 can be employed.

The control unit 37 determines whether the output of the light source 21 is stabilized (step S13). At step S13, because no signal is output from the image sensor 23, the determination of whether the output of the light source 21 is stabilized is made based on any one of the conditions (1) to (3) explained in the first embodiment.

If the output of the light source 21 is stabilized, the control unit 37 performs a CCD drive clock setting 2 of the CCD clock control (step S14). In the CCD drive clock setting 2, the timings of the PH clock and the RS signal are set to normal ones for reading an image. Because of the CCD drive clock setting 2, the image sensor 23 starts sequentially outputting analog image signals (voltage signals) of each pixel at a predetermined line cycle.

Thereafter, an initial setting process including black level calculation and shading correction is performed for reading an image, and reading of an original starts.

In the image signal control process, until the control unit 37 determines that the output of the light source 21 is stabilized, the timings of the PH clock and the RS signal are synchronized. Therefore, even if the initial voltage higher than the rated voltage is applied to the light source 21 and thus the light emission amount rapidly increases, the image sensor 23 hardly outputs a signal, which significantly suppresses the analog image signal output from the image sensor 23. Thus, there is no possibility that the voltage signal higher than an input voltage tolerance is input to the analog signal processing unit 25.

As described above, instead of the CCD clock control, the CCD shift pulse control can be performed. If the CCD shift pulse control is employed, instead of the CCD drive clock setting 1 at step S11, the shift pulse cycle is set to one shorter than the normal one to prevent the maximum voltage of the analog image signal output from the image sensor 23 from exceeding the input voltage tolerance. Thereafter, instead of the CCD drive clock setting 2 at step S14, the shift pulse cycle is set to the normal one.

In this process, the shift pulse cycle input to the image sensor 23 is set to one shorter than the normal one. The shift pulse thus set is kept until the control unit 37 determines that the output of the light source 21 is stabilized. Therefore, even though the initial voltage higher than the rated voltage is applied to the light source 21 and the light emission amount rapidly increases, the charge storage time of each pixel of the image sensor 23 is shortened and the level of the signal to be output from the image sensor 23 is lowered, which controls the analog image signal output from the image sensor 23 and to be input to the analog signal processing unit 25. This method does no lead to a risk that the voltage signal higher than the input voltage tolerance is input to the analog signal processing unit 25.

In the image reading device 200, because the timing of the PH clock and the timing of the RS signal are synchronized until the output of the light source 21 is stabilized, the image sensor 23 hardly outputs the signal. Thus, the analog image signal output from the image sensor 23 and to be input to the analog signal processing unit 25 is controlled. This prevents the analog signal processing unit 25 from being damaged due to input of an overvoltage thereto.

In the image reading device 200, from when the light source 21 is turned on until it is determined that the output of the light source 21 is stabilized, the shift pulse cycle applied to the image sensor 23 is set to one shorter than the normal one. This shortens the charge storing time of each pixel of the image sensor 23, which lowers the level of the signal output from the image sensor 23. Thus, the analog image signal output from the image sensor 23 and to be input to the analog signal processing unit 25 is controlled. This prevents the analog signal processing unit 25 from being damaged due to an overvoltage input thereto.

Figure 8:
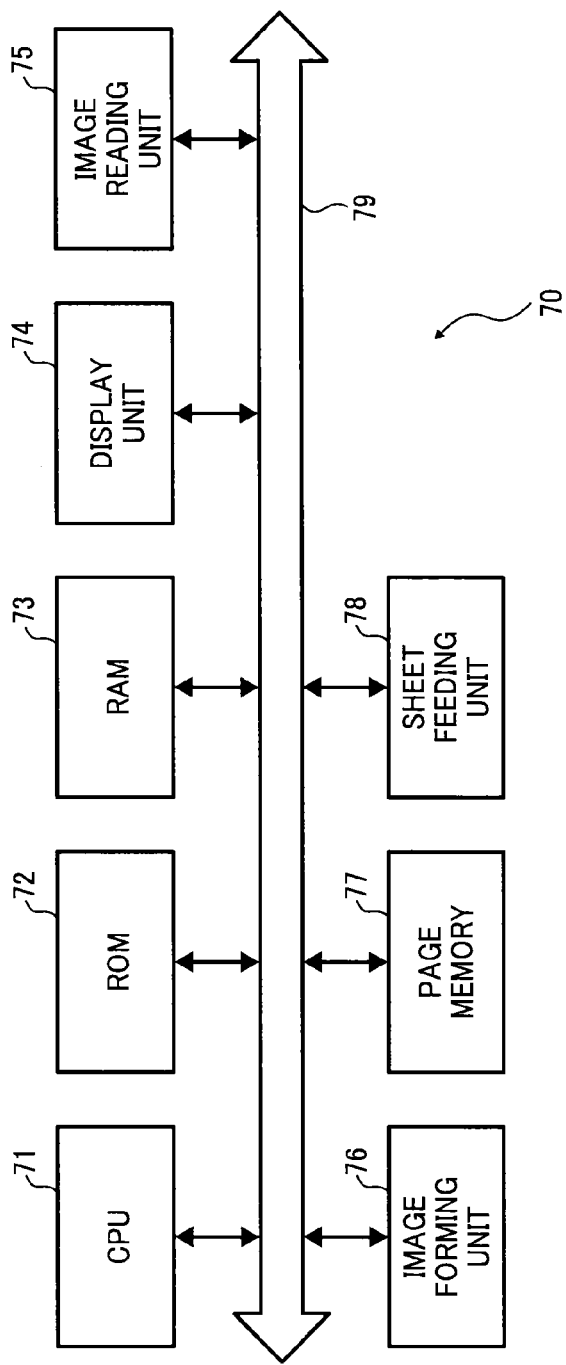
FIG. 8 is a block diagram of an image forming apparatus according to a third embodiment of the present invention.

An image forming apparatus 70 according to a third embodiment is explained below with reference to FIG. 8. FIG. 8 is a block diagram of the image forming apparatus 70. The image forming apparatus 70 is, for example, a copier or a multifunction product (MFP) that includes a function of reading an original and a function of forming an image. The image forming apparatus 70 includes a microcomputer including a CPU 71, a ROM 72, a RAM 73, and a bus 79 that connects the CPU 71, the ROM 72, and the RAM 73 to each other. The CPU 71 controls the image forming apparatus 70. The ROM 72 stores therein an operation program of the CPU 71. The RAM 73 stores therein various types of data and serves as a working memory of the CPU 71.

The image forming apparatus 70 further includes a display unit 74, an image reading unit 75, an image forming unit 76, a page memory 77, and a sheet feeding unit 78 that are connected to each other and connected to the CPU 71 via the bus 79.

The display unit 74 includes a display such as a liquid crystal display (LCD) that displays information on, for example, an operation state of the image forming apparatus 70 and an input device such as a keyboard (including a touch panel) with which a user performs various types of input operations.

The image reading unit 75 is of basically the same configuration as the image reading device 100 or 200. The image reading unit 75 reads an image of an original and outputs a digital image data based on the image. The CPU 71 controls the digital image data and stores the image data in the page memory 77 on a page basis.

The image forming unit 76 is a plotter of, for example, a laser printer or an inkjet printer that prints the image data stored in the page memory 77 on a sheet. The sheet feeding unit 78 feeds a sheet to the image forming unit 76.

If the image reading unit 75 is capable of reading a color image, each color component (R, G, and B) of the color image is read and digital image data of each color component is output. The CPU 71 controls the digital image data and stores the digital image data on a page basis. The image forming unit 76 prints the color image by sequentially transferring images based on the digital image data of each color component onto a sheet in a superimposed manner.

In the image forming apparatus 70 employing a reasonable CCFL as a light source, a time required for enabling an image reading function from when the image forming apparatus 70 is turned or returns to an operating state from power-saving mode (enabling a copying function in a case of a copier) is relatively short. In addition, there is no risk that an IC for processing an analog signal is damaged.

A digital copier, a facsimile apparatus, or a MFP having the functions of, for example, the digital copier, the facsimile apparatus, a printer can be employed as the image forming apparatus 70.

According to an aspect of the present invention, the analog signal processing unit is prevented from being damaged due to input of an overvoltage thereto.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
a light source including a cold cathode fluorescent lamp that emits a light to an original to expose the original;
a turning-on unit that turns on the light source by applying any one of a rated voltage of the light source and an initial voltage that is higher than the rated voltage;
an image sensor that receives light reflected from the original and converts received light into an analog signal;
an analog signal processing unit that converts the analog signal received from the image sensor into digital data;
a turning-on control unit that causes the turning-on unit to apply to the light source the initial voltage when turning on the light source and to apply the rated voltage after the light source has been turned on; and
an image-signal control unit that controls analog signals to be input to the analog signal processing unit from a turn-on time point that is a time point at which the light source is turned on until a stabilization time point that is a time point at which output of the light source is stabilized,
wherein the image-signal control unit includes:
a voltage divider circuit that performs voltage division between the image sensor and the analog signal processing unit; and
a voltage-divider-circuit control unit that enables the voltage divider circuit from the turn-on time point until the stabilization time point, and that disables the voltage divider circuit after the stabilization time point,
wherein the voltage divider circuit includes a series circuit including:
a first resistor that is serially arranged on a signal path of the analog signal from the image sensor to the analog signal processing unit; and
a second resistor and a switching element that is connected between an output point of the first resistor and a ground.

2. The image reading device according to claim 1, wherein the voltage divider circuit is enabled to reduce a maximum value of the analog signal output by the image sensor and to be input to the analog signal processing unit by voltage division to a value lower than an input voltage tolerance of the analog signal processing unit.

3. An image forming apparatus comprising:
an image reading unit that outputs digital data; and
an image forming unit that prints the digital data on a recording medium, wherein
the image reading unit includes
a light source including a cold cathode fluorescent lamp that emits a light to an original to expose the original;
a turning-on unit that turns on the light source by applying any one of a rated voltage of the light source and an initial voltage that is higher than the rated voltage;
an image sensor that receives light reflected from the original and converts received light into an analog signal;
an analog signal processing unit that converts the analog signal received from the image sensor into digital data;
a turning-on control unit that causes the turning-on unit to apply to the light source the initial voltage when turning on the light source and to apply the rated voltage after the light source has been turned on; and
an image-signal control unit that controls analog signals to be input to the analog signal processing unit from a turn-on time point that is a time point at which the light source is turned on until a stabilization time point that is a time point at which output of the light source is stabilized,
wherein the image-signal control unit includes
a voltage divider circuit that performs voltage division between the image sensor and the analog signal processing unit; and
a voltage-divider-circuit control unit that enables the voltage divider circuit from the turn-on time point until the stabilization time point, and that disables the voltage divider circuit after the stabilization time point,
wherein the voltage divider circuit includes a series circuit including
a first resistor that is serially arranged on a signal path of the analog signal from the image sensor to the analog signal processing unit; and
a second resistor and a switching element that is connected between an output point of the first resistor and a ground.

4. The image forming apparatus according to claim 3, wherein the voltage divider circuit is enabled to reduce a maximum value of the analog signal output by the image sensor and to be input to the analog signal processing unit by voltage division to a value lower than an input voltage tolerance of the analog signal processing unit.

* * * * *